(12) United States Patent
Zissel (10) Patent No.: US 7,889,145 B2
(45) Date of Patent: Feb. 15, 2011

(54) ARRANGEMENT WITH A TRANSPONDER AND A METAL ELEMENT

(76) Inventor: Hardy Zissel, Küchenmeisterallee 15, 15711 Königs Wusterhausen (DE)

(*) Notice: Subject to any disclaimer, the term of this patent is extended or adjusted under 35 U.S.C. 154(b) by 389 days.

(21) Appl. No.: 11/915,756

(22) PCT Filed: Jun. 1, 2006

(86) PCT No.: PCT/DE2006/000956

§ 371 (c)(1),
(2), (4) Date: May 14, 2008

(87) PCT Pub. No.: WO2006/128448

PCT Pub. Date: Dec. 7, 2006

(65) Prior Publication Data

US 2009/0027297 A1    Jan. 29, 2009

(30) Foreign Application Priority Data

| Jun. 1, 2005 | (DE) | .................... | 20 2005 008 891 U |
| Nov. 2, 2005 | (DE) | .................... | 20 2005 017 229 U |
| Nov. 29, 2005 | (DE) | .................... | 20 2005 018 589 U |
| Jan. 19, 2006 | (DE) | .................... | 20 2006 000 902 U |
| Mar. 7, 2006 | (DE) | .................... | 20 2006 003 721 U |
| Mar. 16, 2006 | (DE) | .................... | 20 2006 004 369 U |

(51) Int. Cl.
*H01Q 13/10* (2006.01)

(52) U.S. Cl. ...................................... 343/767; 343/769
(58) Field of Classification Search ................ 343/702, 343/718, 767, 769
See application file for complete search history.

(56) References Cited

U.S. PATENT DOCUMENTS

| 5,767,789 | A | 6/1998 | Afzali-Ardakani et al. |
| 6,628,237 | B1 | 9/2003 | Forster et al. |
| 7,098,850 | B2 | 8/2006 | King et al. |
| 2002/0177408 | A1* | 11/2002 | Forster et al. ................. 455/41 |
| 2004/0061655 | A1* | 4/2004 | Forster et al. ............... 343/767 |
| 2005/0190111 | A1* | 9/2005 | King et al. .................. 343/767 |
| 2005/0275591 | A1* | 12/2005 | King et al. ............ 343/700 MS |
| 2006/0109130 | A1 | 5/2006 | Hattick et al. |

FOREIGN PATENT DOCUMENTS

| DE | 19854862 | 6/1999 |
| DE | 20214099 | 1/2003 |
| DE | 10227681 | 2/2004 |
| EP | 1541795 | 6/2005 |

* cited by examiner

*Primary Examiner*—HoangAnh T Le
(74) *Attorney, Agent, or Firm*—Schmeiser, Olsen & Watts, LLP (57) ABSTRACT

The invention relates to an arrangement with a transponder (2) and a metal component (1) provided for the transponder (2). An antenna for the transponder (2) is formed by a recess (3) in the metal component (1).

25 Claims, 9 Drawing Sheets

Fig. 15b

ARRANGEMENT WITH A TRANSPONDER AND A METAL ELEMENT

The invention relates to an arrangement with a transponder and a metal component allocated to the transponder.

BACKGROUND OF THE INVENTION

In many fields of business activity, particularly in the field of logistics, so-called transponders are applied for the designation and later identification of goods and other items. These are communication devices which are capable of communicating with a communication apparatus. In this case, the communication is preferably wireless. With a frequently applied form of a transponder, the communication takes place by means of high frequency or radio signals. Such transponders are designated as high frequency transponders. If these are configured for identification purposes, they are described as so-called RFID-transponders (RFID →"Radio Frequency Identification", high frequency identification).

An RFID-transponder normally comprises a transponder chip and an aerial. Electromagnetic signals are received by way of the aerial and are converted into electric signals which, by way of a connection between the aerial and the transponder chip, are then transmitted to the latter. The electric signals can then be evaluated in the transponder chip in order to receive information on an identification enquiry, for example. Following this, the transponder chip produces further electric signals as a response to the identification enquiry which are transmitted to the aerial and are converted by this into beam-capable electromagnetic signals.

The document DE 202 14 099 U1 discloses a beverage vessel, to which such a transponder is secured which has information electronically stored about the beverage vessel and its contents. Packing containers are described in the document DE 298 21 877 U1, where a transponder is secured by means of a special holder to each container. Holders are presented which ensure a reliable and extensively jolt-free holding of the transponder at the packing container.

Compared with a designation of items by way of non-electronic means, such as a barcode for example, RFID-transponders have the advantage that they can even then communicate by way of a high frequency connection by means of the communication apparatus if the RFID-transponder is arranged in the item or is otherwise covered off so that a visual identification is not possible. Furthermore, an information stored in the RFID-transponder can be changed or supplemented at all times.

If the item to be designated, however, comprises a metal component or is even completely formed from metal, there can be a detrimental effect on the function of the transponder because the metal component absorbs at least a part of the electromagnetic energy from the electromagnetic signals to be received or to be transmitted. If, for example, a transponder is arranged in an enclosed metal container, then the metal container forms a Faraday cage which substantially suppresses a communication between the transponder and an externally located apparatus.

In order to solve the problem of the negative effect on the function caused by the metal component, the attempt is made to secure the transponder or at least its aerial in such a way and as good as possible so that there is a maximum clearance between the metal component and the aerial. This is achieved, for example, by securing the transponder onto the surface of the metal component by means of a very thick adhesion film. However, the results of such an approach leave much to be desired, particularly in view of the fact that the attaching of a thick adhesion film leads to a situation where the transponder is standing away from the surface of the metal component.

THE INVENTION

It is the object of the invention to present an arrangement with a transponder and a metal component where an improved communication is ensured between the transponder and a communication apparatus located separately from the transponder. In this way, the negative effect on the function of the transponder is to be minimised which can usually occur with the arrangement of the transponder near to a metal component.

According to the invention, an arrangement with a transponder and a metal component allocated to the transponder is envisaged wherein an aerial for the transponder is formed by means of a recess in the metal component. Compared with the state of the art, the formation of the aerial by means of a recess in the metal component has the advantage that the radiation characteristics of the aerial can be essentially determined by the layout of the recess. Furthermore, such aerials can be electrically connected to further metal components without having subsequent substantial influence on the radiation characteristics.

In an advantageous further development of the invention, a cover allocated to the recess is envisaged.

In a convenient further development of the invention, a cavity is envisaged which is enclosed by the cover and the metal component.

In a preferred embodiment of the invention, the cover comprises one or a combination of the following materials: a metal material or a non-metal material.

In a convenient embodiment of the invention, the cavity is at least partially filled with a dielectric material.

In a convenient further development of the invention, the dielectric material in the cavity (23) is formed from the same material as the cover.

In a further development of the invention, the cover and/or the dielectric material in the cavity is/are formed as a screening.

In an advantageous further development of the invention, the aerial formed by means of a recess in the metal component is executed as a high frequency aerial and the transponder is executed as a high frequency transponder.

In a convenient further development of the invention, the recess is formed at least partially as a breakthrough in the metal component.

In a preferred embodiment of the invention, it is envisaged that the transponder is secured at the metal component. The securement can be by means of sticking or adhesive means. However, the securement can also be performed by means of another suitable fastening method such as, for example, by means of clamping, screwing and/or soldering.

In a convenient further development of the invention, the recess in the metal component has an extended form. In this case, the recess has a length which is preferably 5% shorter than the half of the wavelength of the frequency for which the aerial is designed. Furthermore, the width of the recess has the single or double thickness of the material used for the metal component. The bandwidth of the aerial can be increased by enlarging the width of the recess at least in the vicinity of the end areas of the extended form.

In a preferred embodiment of the invention, the recess in the metal component has the form of a ring segment.

In an advantageous embodiment of the invention, and between the transponder and the aerial formed by the recess in the metal component, a connection is formed for the transmission of signals between the transponder and the aerial.

In a convenient further development of the invention, the connection comprises a capacitive and/or an inductive connection. In this embodiment, the transponder can be galvanically separated from the metal component.

In an advantageous further development of the invention, it is envisaged that the connection is formed by means of contacts.

In a preferred embodiment of the invention, the connection comprises a coaxial cable. In an advantageous embodiment of the invention, the transponder is arranged at least partially in the recess in the metal component.

In a preferred further development of the invention, the transponder is completely sub-merged in the recess in the metal component.

In a convenient further development of the invention, it is envisaged that the recess in the metal component is partially or fully filled up with a non-conductive material.

In a preferred embodiment of the invention the recess in the metal component is filled up with the non-conductive material, at least up to a thickness which is one fiftieth as large as the wavelength of the electromagnetic signals for which the aerial, formed by the recess in the metal component, is designed.

In a convenient embodiment of the invention, the metal component with the recess is part of a pipe-shaped component. The pipe-shaped component can be, for example, part of a bicycle frame which can be identified by data stored in the transponder. This can be, for example, useful for locating a stolen bicycle.

In an advantageous further development of the invention, the recess is formed along the longitudinal axis of the pipe-shaped component.

In a preferred further development of the invention, the metal component with the recess is part of a container. In this case every form of a vessel is selectable, for example beverage vessels, containers for electronic circuits, troughs for batteries. In this way, it is possible to locate the vessels/containers which are equipped with a transponder in such a way. Information as to the contents and the ambient conditions of the container can be stored in the transponder and retrieved later.

In a convenient embodiment of the invention, it is envisaged that the container comprises a grid box.

In an advantageous embodiment of the invention, the container is a beverage barrel.

In a preferred further development of the invention, the metal component with the recess is part of a motor vehicle registration plate.

In an advantageous further development of the invention, the transponder comprises a further aerial.

DESCRIPTION OF PREFERRED EMBODIMENT EXAMPLES OF THE INVENTION

The invention is described as follows in greater detail on the basis of embodiment examples with reference to Figures of a drawing. These Figures show the following:

FIG. 15b a detail view onto the aerial structure of the closure from FIG. 15a.

Figure 1:
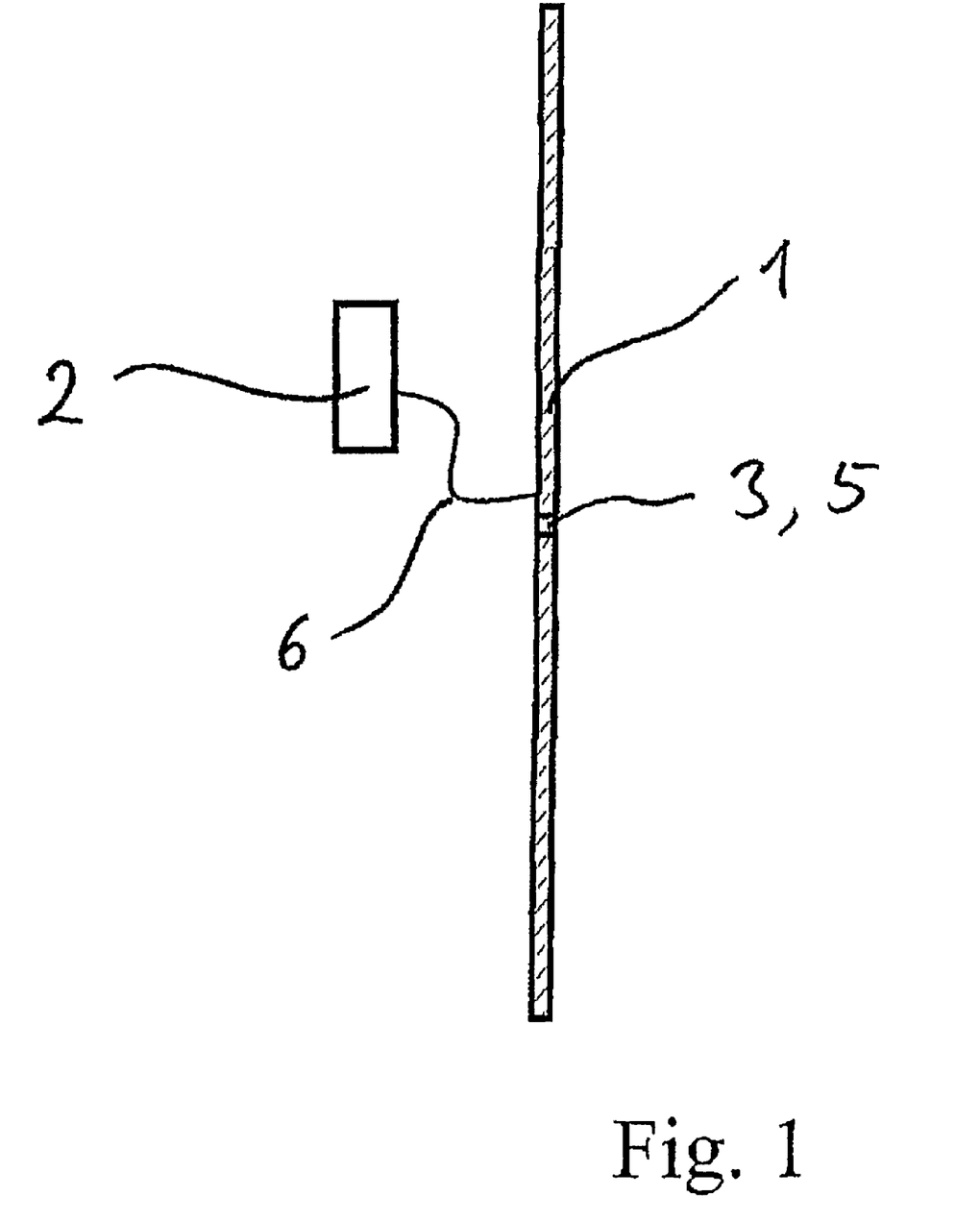
FIG. 1 a cross-sectional view onto an arrangement with a transponder and a metal component.

FIG. 1 shows a cross-sectional view of an arrangement with a transponder 2 and a metal component 1. A recess 3 is formed in the metal component 1. By means of the recess 3 in the metal component 1, an aerial is formed for the transponder 2 which is connected to this aerial by means of a connection 6.

The connection 6 shown here is a connection 6 by means of an electric line. However, the connection 6 can comprise any random connection, by means of which there can be an exchange of signals between the transponder 2 and the aerial. For example, the connection 6 can comprise a capacitive and/or an inductive coupling.

The recess 3 shown in FIG. 1 extends over the entire thickness of the metal component 1 and therefore forms a breakthrough 5 in the metal component 1. In a simplified manner the functioning mode with such an aerial, which is formed by means of a breakthrough 5 in a metal component 1, can be described as follows. Essentially, the breakthrough 5 represents a negative image of a dipole aerial. That means that at that location where there is metal at a rod dipole or a Gaussian dipole, there is none here and where there is no metal around the rod dipole, there is here the metal of the metal component 1. This "negative" structure is accompanied by an exchange of the polarisation direction. The polarity of the electric field (E-field) and the magnetic field (H-field) of an electromagnetic signal beamed from the aerial or received by it is therefore exchanged compared with the conditions involving a rod dipole. This characteristic of the aerial can be taken into consideration with the alignment of an aerial of a communication device used as a reading and writing equipment unit. In order to change the polarisation, the form of the breakthrough 5 can be executed in a curved manner.

Figure 2:
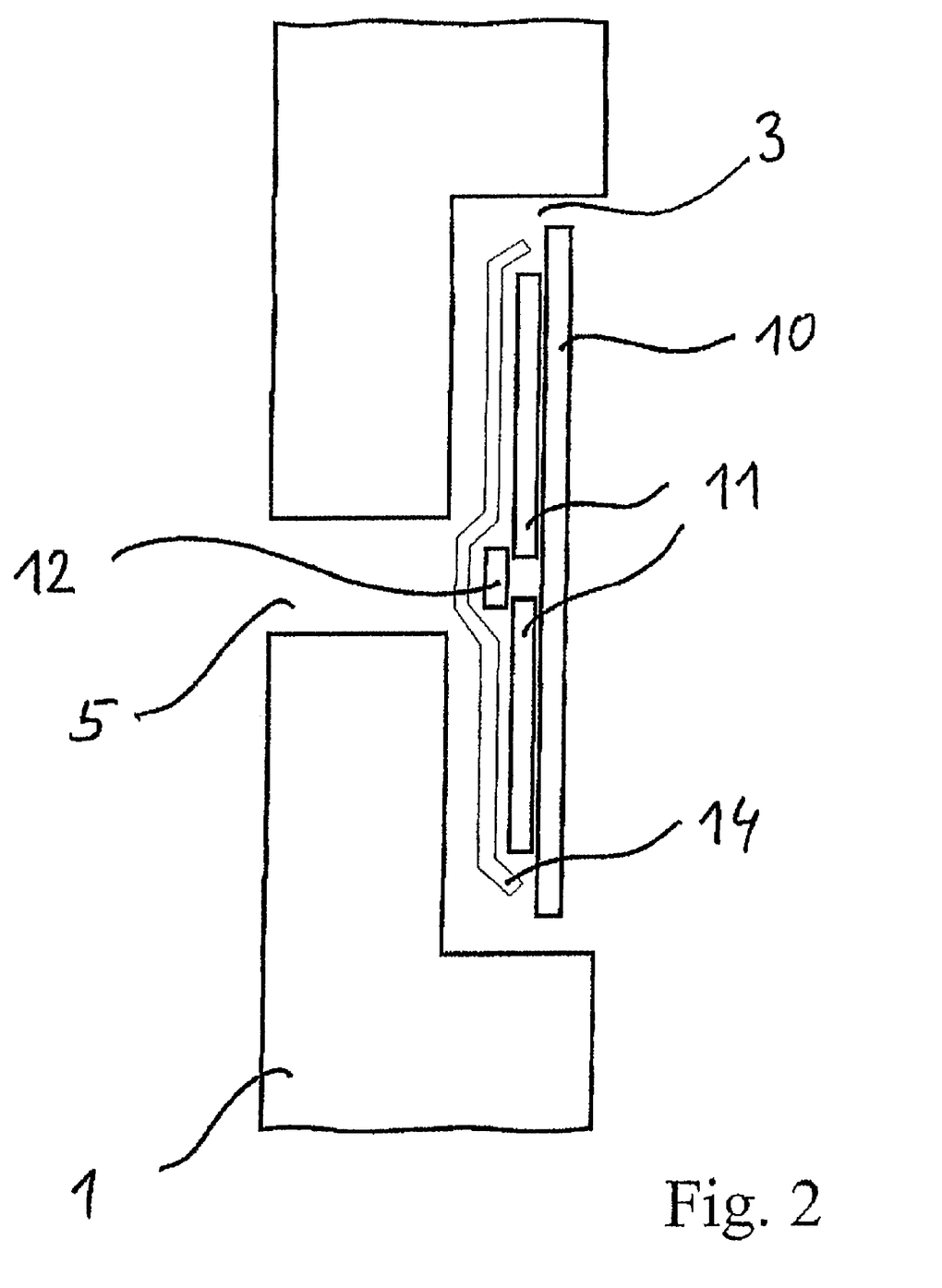
FIG. 2 a cross-sectional view onto a further arrangement with a metal element and a transponder.

FIG. 2 shows a cross-sectional view onto a further arrangement with a metal component 1 and a transponder 2. The metal component 1 has a recess 3 which is only partially executed as a breakthrough 5. The transponder 2 comprises a substrate 10 from a non-conductive metal and a transponder chip 12. Furthermore, the transponder comprises flat-shaped metal elements 11 by means of which a capacitive coupling is established between the transponder 2 and the aerial formed by means of the recess 3 in the metal component 1. The capacitive coupling is established by the formation of a capacitor by the flat-shaped metal elements 11 with the metal component 1.

With the use of the arrangement, the aerial receives electromagnetic signals from a communication device, for example a mobile read-out device for RFID-transponders. The electromagnetic signals are converted into electric signals by means of the aerial and transmitted to the transponder chip 12 by way of the capacitive coupling. This chip can process the information contained in the electromagnetic signals, for example involving an identification enquiry, and generate a relevant response.

The answer is again transmitted to the aerial by way of the connection 6 formed by the capacitive coupling, and is then beamed from the aerial. As a surface for the flat-shaped elements 11, a space of approximately 20 mm$^2$ for each flat-shaped metal element 11 has proved to be adequate with the present commonly used transponder chips 12 for the UHF-frequency range.

Information on the geographic position of the metal component 1 can be stored in the transponder 2. The transmission of this information means of electromagnetic signals can be effected by way of radio networks, particularly mobile radio networks, for example by way of a GSM-network, an UMTS-network or similar.

The transponder 2 is arranged completely in the recess 3 and is secured to the metal component 1 at that location by means of an adhesion layer 14. In one embodiment, the flat-shaped metal elements 11 fully penetrate the adhesion layer 14 when attaching the trans-ponder 2, so that a galvanic contact is established which has a supportive effect on the connection 6 between the aerial and the transponder 2. This mode of securement has the advantage that the transponder 2, in the form of prefabricated modules, can be easily taken off a roll either automatically or manually and then reliably secured to the metal component 1.

As the transponder 2 is completely arranged in the recess 3, it is ensured that there is no projection on a surface of the metal component 1. In order to obtain a flat surface on the metal component 1 in the zone of the recess 3 also, the recess can be filled up with an electrically non-conductive material. An at least partial filling with a dielectric material can also be desirable for the purpose of influencing the connection 6 between the transponder 2 and the aerial and/or the beaming reaction of the aerial. Moreover, a fluid-impermeable metal component 1 with a recess 3 can be created by the filling of the breakthrough 5. This is particularly significant with metal components 1 which are part of a container, a beverage vessel for example.

The transponder 2 itself can be each and every suitable transponder. For example, passive as well as active transponders are selectable. Moreover, an additional aerial according to the conventional mode for commercial transponders can be envisaged.

Figure 3:
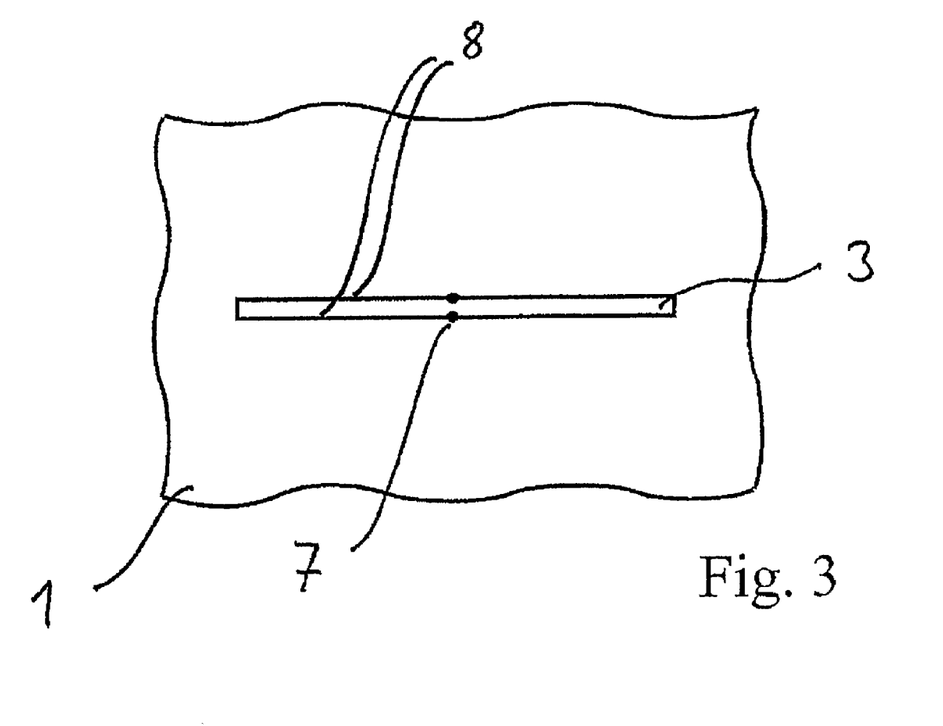
FIG. 3 a top view onto a metal component with an extended recess.
Figure 4:
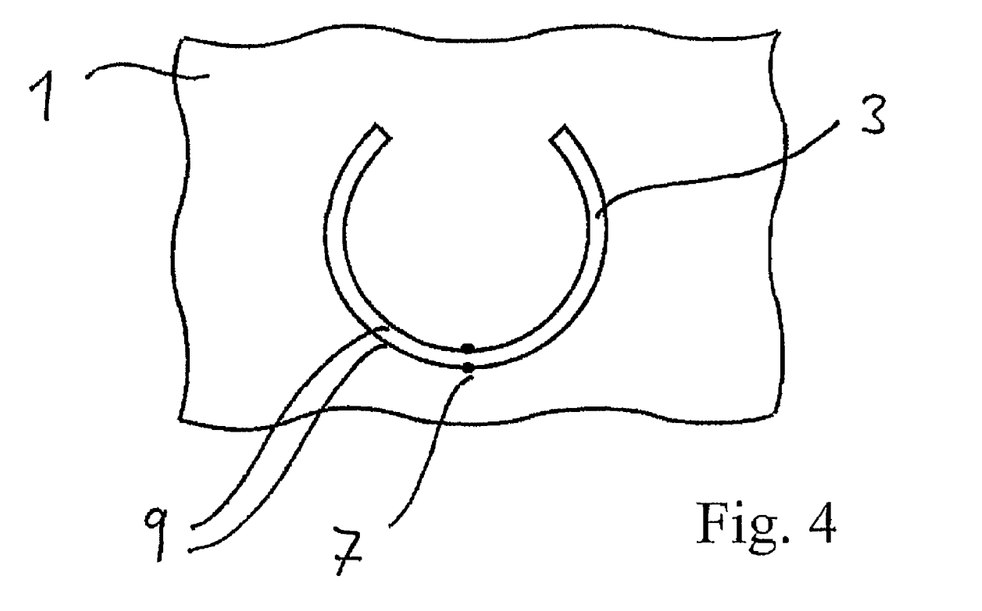
FIG. 4 a top view onto a metal component with a ring-segment-shaped recess.

Each of the FIGS. 3 and 4 shows a top view onto an embodiment of a metal component 1 with a differently configured recess 3 in each case. The recess 3 in FIG. 3 is formed as an extended recess which is limited by two longitudinal edges 8 and two edges vertical to the longitudinal edges 8. A contact 7 is formed on each of the longitudinal edges 8. By means of the contacts 7, a transponder 2 is connected to the aerial which is formed by means of the recess 3 in the metal component 1. An aerial formed according to FIG. 3 is generally designated as a slot-type aerial also. With such an aerial, the size of the recess 3 in the longitudinal direction is preferably larger by a multiple than transverse to the longitudinal direction. Furthermore, the size transverse to the longitudinal direction, meaning the width of the recess 3, should lie in the magnitude of the thickness of the metal component 1. The position of the contacts along the longitudinal edges 8 is random. However, every contact 7 on the relevant longitudinal edge 8 preferably has a central arrangement.

The metal component 1 shown in FIG. 4 is different to the metal component 1 from FIG. 3 in that the recess 3 has a ring-segment-shaped pattern. Instead of the longitudinal edges 8 of the extended recess 3, the ring-segment-shaped recess 3 has circular-segment-shaped edges 9. In this embodiment also, a contact 7 is arranged in each case on a relevant circular-segment-shaped edge 9, preferably centrally located.

In addition to the examples shown in FIGS. 3 and 4 for the formation of an aerial, a third embodiment is of fundamental significance. In this case a metal layer (not shown) insulated from the metal component is inserted into an extended breakthrough 5, wherein the distance between rims of the breakthrough 5 and the inserted insulated metal layer are executed larger than or equal to the thickness of the metal component 1. In this case, and for the formation of the connection 6 to the transponder 2, contacts 7 can be arranged not only on a rim of the breakthrough 5 but on the insulated metal layer as well.

The three basic variants, as stated, for the formation of the aerial, namely Variant I: extended recess 3, Variant II: ring-segment-shaped recess 3 and Variant III: extended recess 3 with insulated metal layer (not shown), have different characteristics in each case. The electromagnetic field beamed from the aerial according to Variant I has a polarisation field turned at 90° to the longitudinal direction of the recess 3. With Variant II, the electromagnetic field is unpolarised. Both variants have the advantage that the adjustment to the wave resistance of a cable connected to the aerial can be optimised by a shifting of the contacts 7 along the longitudinal direction of the recess 3.

Variant III, from the very beginning, matches well to cables and transponder chips with a wave resistance of 50 Ohm.

By selecting the size and form of the recess 3 as well as that of the material of the metal component 1, influence can be made on the beam characteristics of the aerial form in this way. With the embodiments shown in FIGS. 3 and 4, the extension of the recess 3 along the longitudinal edges 8 or along the circular-segment-shaped edges 9 determines the frequency with which the aerial optimally works or for which the aerial is designed, whereas the extension transverse hereto determines the bandwidth of the aerial. The selectable sizes and forms are manifold and are only limited by the form and size of the metal component 1 and the manufacturing means available.

A filling up of the recess 3 can be envisaged. If the recess 3 comprises a breakthrough 5 through the metal component 1, a fluid passage through the breakthrough 5 can be prevented by the filling. The filling is performed preferably with a non-conductive closure material. In a preferable manner the recess 3 is filled up completely and, in addition, is covered with closure material in such a way that an elevation is formed over the recess 3. The elevation preferably has a length which is approximately 20% larger than the length of the recess and has a width which is larger than the width of the recess. The applied closure material can comprise a casting mass and/or a form piece.

Figure 5:
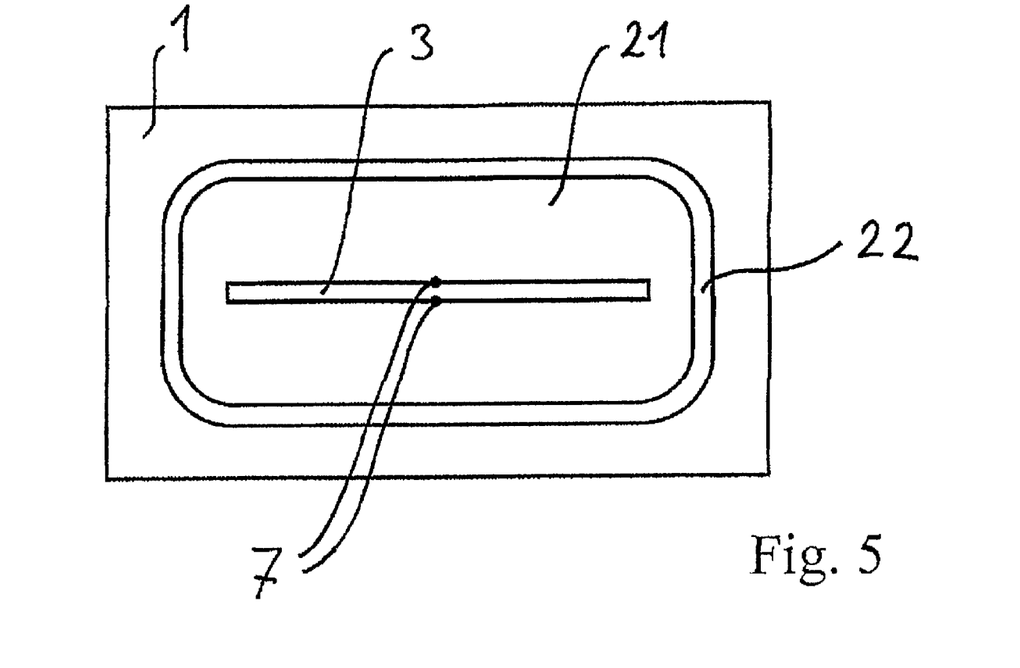
FIG. 5 a top view onto a metal component with a recess and a lowered area.

FIG. 5 shows a metal component 1 with a recess 3 and a lowered zone 21 in top view. The lowered zone 21 is surrounded by a peripheral wall 22 and has an extended recess 3 which has essentially a rectangular form. The metal component 1 can be used, for example, for the covering of electronic structural elements or similar. For example, the metal component 1 can be part of a metal sheet cover which is envisaged with electronic assembly groups which are installed as drawer units in cubicles. In order to produce a uniform closure for the electronic assembly groups, such sheet covers are formed as a front plate in a uniform plane. Because of the lowered zone 21, a space is created in which the electronic structural elements of an electronic assembly group can be arranged. As a result furthermore, a minimum clearance is ensured between the aerial formed by the recess 3 in the metal component 1 and the electronic structural elements covered off by the metal component 1. For an optimal function of the aerial, a minimum clearance of approximately $\frac{1}{30}$ of the wave length of a working frequency, for which the aerial is designed, is desirable.

Figure 6:
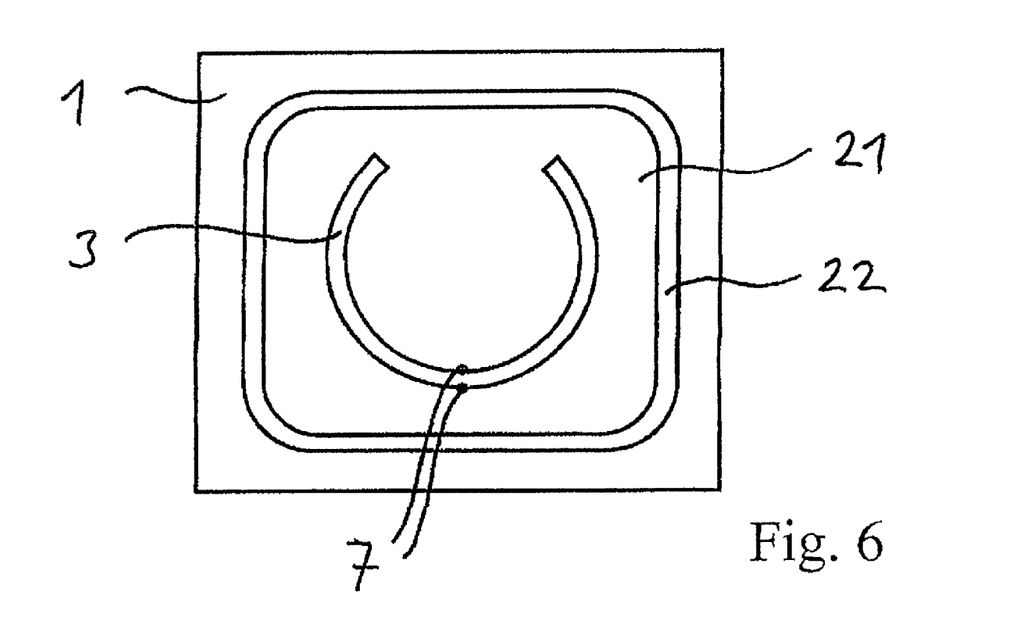
FIG. 6 a top view onto a further metal component with a recess and a lowered area.

A further metal component 1 with a recess 3 and a lowered zone 21 is shown in FIG. 6. The further metal component 1 from FIG. 6 is formed in a similar way as the metal component 1 from FIG. 5 wherein the recess 3, as in FIG. 4, is formed as a ring-segment-shaped recess.

Figure 7:
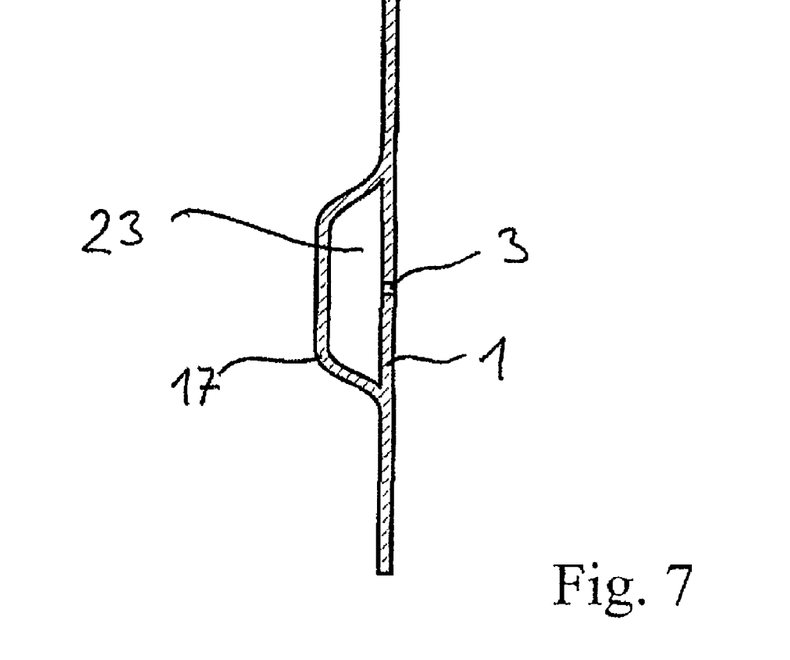
FIG. 7 a cross-sectional view onto a metal component with a breakthrough and a cover.
Figure 8:
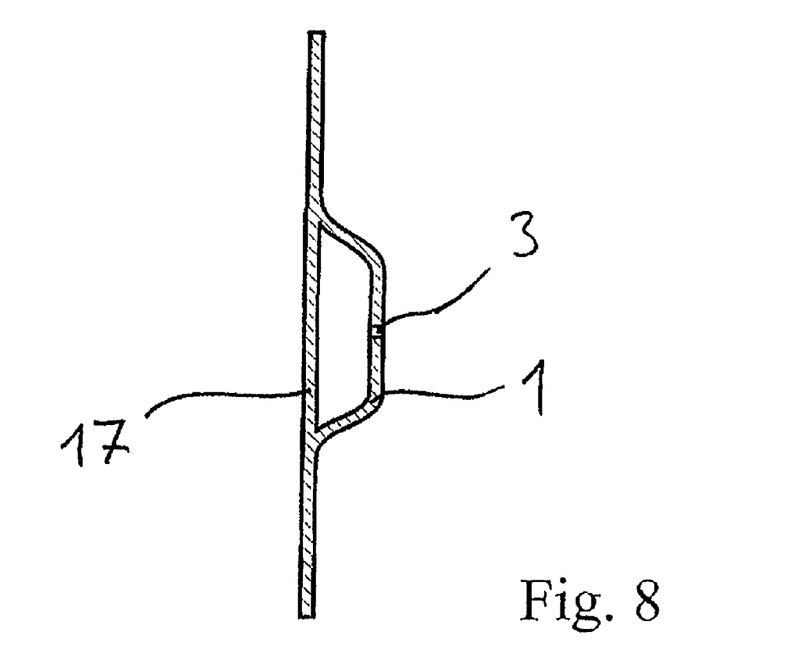
FIG. 8 a cross-sectional view onto a further metal component with a breakthrough and a cover.

FIGS. 7 and 8 illustrate by means of cross-sectional views two different approaches for the purpose of forming, by means of a cover 17, a cavity 23 which adjoins a zone of the metal component 1 in which the recess 3 is formed. This is then particularly purposeful if the metal component 1 is part of a wall which segregates an internal zone from an external zone in which electromagnetic signals are beamed off or from which electromagnetic signals are received by means of the aerial. If it is to be expected that the conditions, such as for example the temperature or the air humidity, vary in the internal zone, then by means of the cover 17 work point fluctuations of a transponder 2 located in the cavity 23 are reduced or even prevented as a result of the varying conditions. In this way furthermore, and with the existence of a material in the internal zone, such as for example a filling material in a container, it is prevented that the ambient of the aerial changes and its beaming characteristic is influenced.

The cavity 23 is preferably filled up with a non-conductive material such as for example a synthetic material in order to additionally improve the stability of the conditions in the cavity 23 and/or the mechanical strength of the arrangement of metal component 1 and trans-ponder 2. The embodiment of the arrangement shown in FIG. 8 comprises a metal component 1 which is formed similar to the embodiments from FIGS. 5 and 6 with a lowered zone 21 in which again the recess 3 is formed.

In one embodiment the cover 17 can comprise a non-conductive material. The cover 17 secured to the metal component 1 is, however, preferably formed from a conductive material and electrically connected to the metal component 1 or galvanically separated from this. By means of the cover 17, the mechanical stability of the metal component 1 can be increased which can be detrimentally affected as a result of the recess 3. Furthermore, and with the envisaging of a suitable material and/or a suitable structure, the cover 17 can be formed as a screening against electric, magnetic and/or electromagnetic disturbances. If the metal component 1 with the transponder 2 is arranged in the vicinity of structural elements which are disadvantageously influenced in their function as a result of beamed electromagnetic waves, the cover 17 advantageously comprises a ferrite material which absorbs electromagnetic waves, particularly high frequency waves, produced by the transponder 2.

Figure 9:
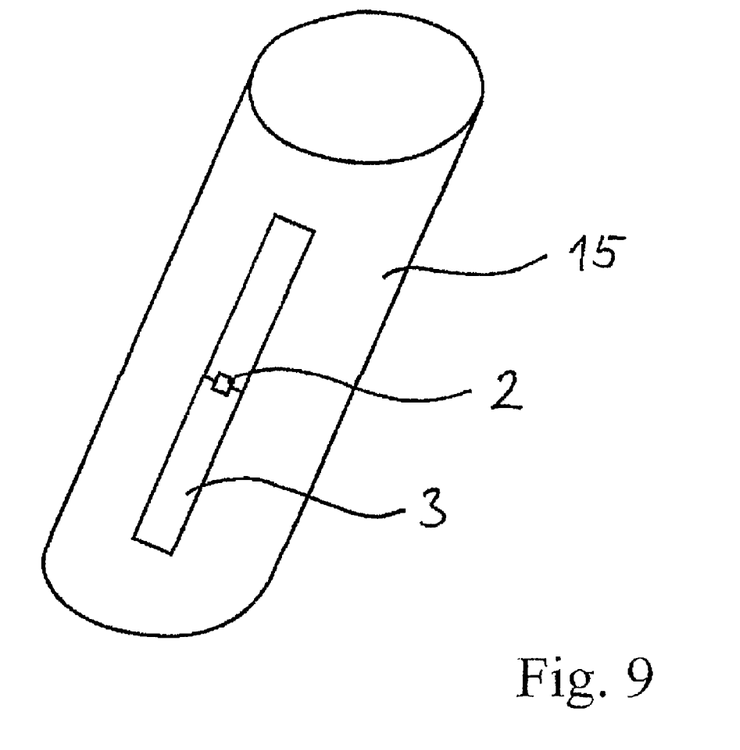
FIG. 9 an arrangement with a transponder and a pipe-shaped component.

FIG. 9 shows an arrangement with a transponder 2 and a metal component 1 which is executed as part of a pipe-shaped component 15. The pipe-shaped component 15 can be, for example, a part of a mobile or stationary supporting structure. Preferably, it is part of a bicycle frame. In a wall enclosure of the pipe-shaped component 15, an extended recess 3 is formed in which the transponder 2 is located. The recess 3 has a longitudinal axis which is formed along a longitudinal axis of the pipe-shaped component 15. However, it can also have another suitable form for the formation of an aerial.

Figure 10:
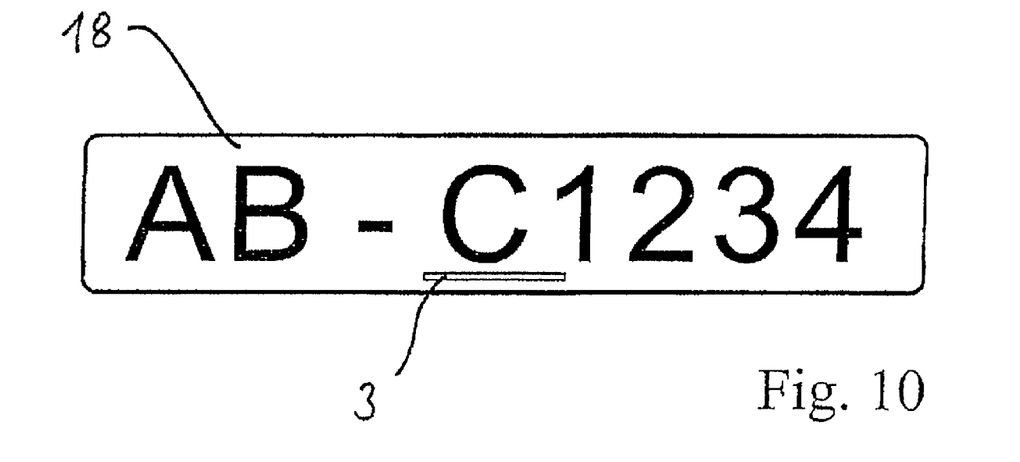
FIG. 10 a motor vehicle registration plate with a recess.

FIG. 10 shows a motor vehicle registration plate 18 with a recess 3. By means of the recess 3 in the metal sheet of the motor vehicle registration plate 18, an aerial for a transponder (not shown) is formed. The transponder can be secured to the motor vehicle registration plate 18. For example, it can be adhesively stuck onto the back surface of the motor vehicle registration plate 18 or can be arranged in the recess 3. The recess 3 is formed as an extended recess 3 but can, however, have any random form adapted to the individual rim conditions. The transponder can have information available for retrieval which identifies the vehicle carrying the motor vehicle registration plate 18. In addition to a visual check of the alphanumerical designation on the surface of the motor vehicle registration plate 18, the option is subsequently established of carrying out an identification by means of a read-out of the transponder on the electronic route over relatively large distances. Furthermore, in a memory of the transponder, data on the vehicle can be stored, for example manufacturer's data, information on maintenance work already performed or to be performed in the future on the vehicle and similar.

Figure 11:
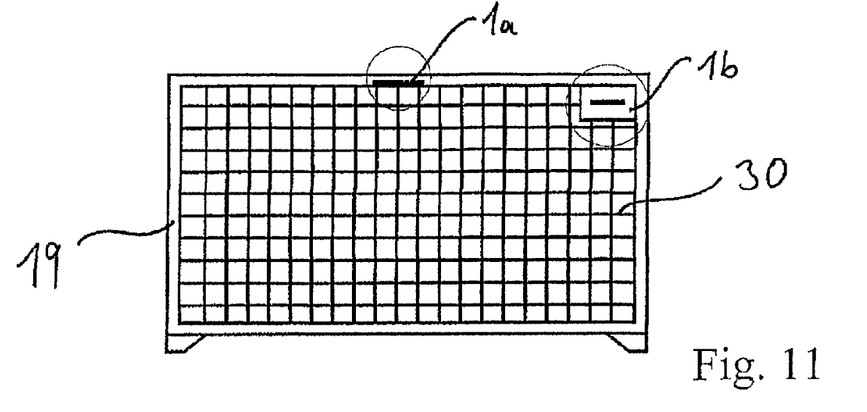
FIG. 11 a grid box with two metal components with recesses.
Figure 12A:
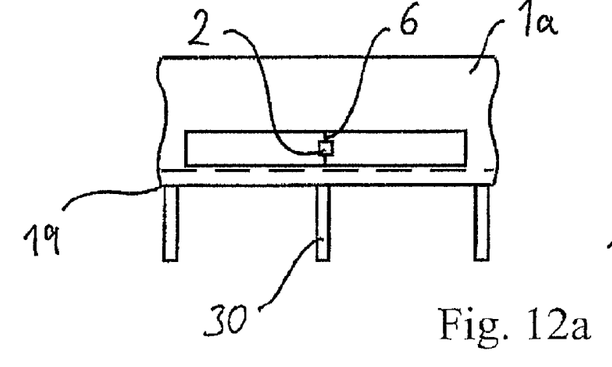
FIG. 12a a top view onto the recess in one of the metal components from FIG. 11.
Figure 12B:
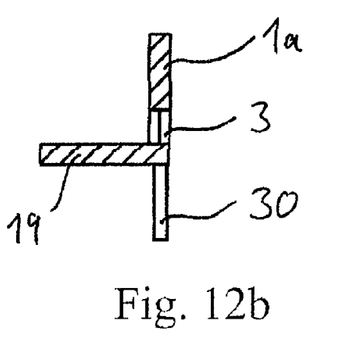
FIG. 12b a cross-sectional view onto the recess in one of the metal components from FIG. 11.

FIG. 11 shows a grid box 19 with a metal component 1a and a further metal component 1b. The grid box 19 has struts 30 which segregate an internal zone of the grid box from an external zone. The metal component 1a is shown in top view in FIG. 12a and in FIG. 12b in a cross-sectional view.

Figure 13:
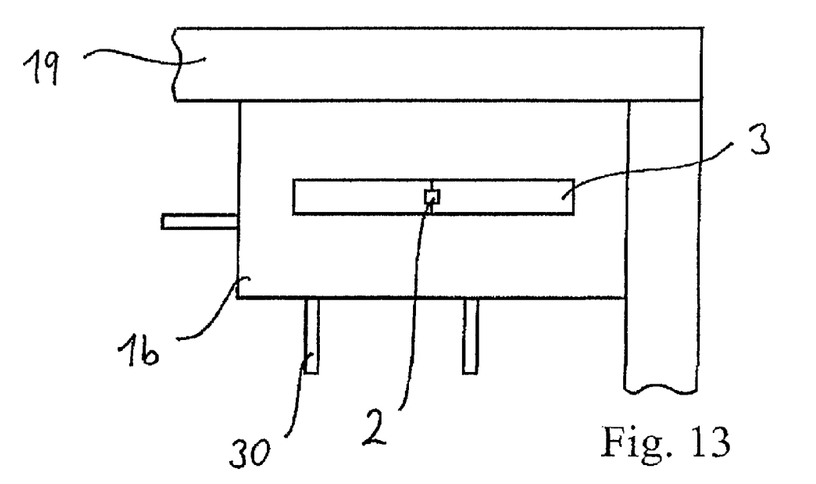
FIG. 13 a top view onto the recess in the second of the metal components from FIG. 11.

The metal component 1 a has a recess 3 in the form of a breakthrough 5 in which a trans-ponder 2 is arranged. Furthermore, a connection 6 from the transponder 2 to the rim zones of the breakthrough 5 in the metal component 1a is envisaged. In FIG. 13, the further metal component 1b from FIG. 11 is shown in a detail view. The further metal component 1b is located in a corner zone of the grid box 19 and replaces a part of the struts 30.

Figure 14:
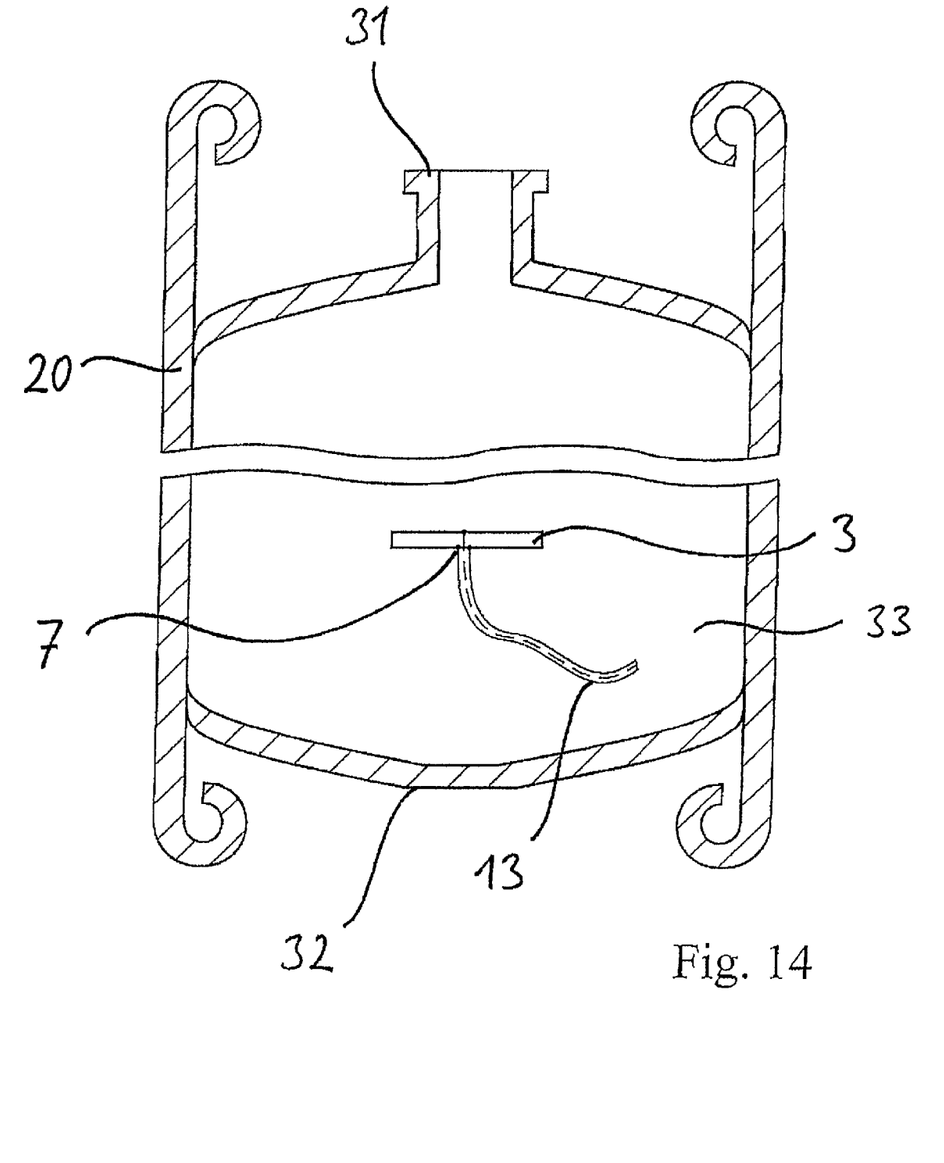
FIG. 14 a beverage barrel with a metal outer wall with a recess.

The cross-sectional view in FIG. 14 shows a beverage barrel 20 with a metal external wall 33. The beverage barrel 20 is a metal beer barrel. The beverage barrel 20 has an opening 31 and a barrel bottom 32. On an internal surface of the external wall 33 a recess 3 is envisaged, by means of which an aerial for a transponder is formed. With the help of contacts 7, a coaxial cable 13 is connected to an end of the aerial formed in this way, while the other end of the coaxial cable 13 is connected to a transponder (not shown). Even though a beer barrel is shown in FIG. 14, every other beverage barrel 20 or also another form of barrel, for example for chemicals, can be used in order to form an aerial for the transponder by means of the recess 3. The metal component 1 can also be formed as a part of other beverage vessels. For example, beverage cans or beverage bottles can be provided with transponders 2 wherein the external wall 33 is at least partially formed from a metallic material. If the recess in the external wall 33 is executed as a breakthrough 5, it is important that the breakthrough 5 is filled with a non-conductive material or is closed with a layer of non-conductive material covering the breakthrough 5 in order to prevent any possible exit of a liquid from the beverage barrel 20.

Figure 15A:
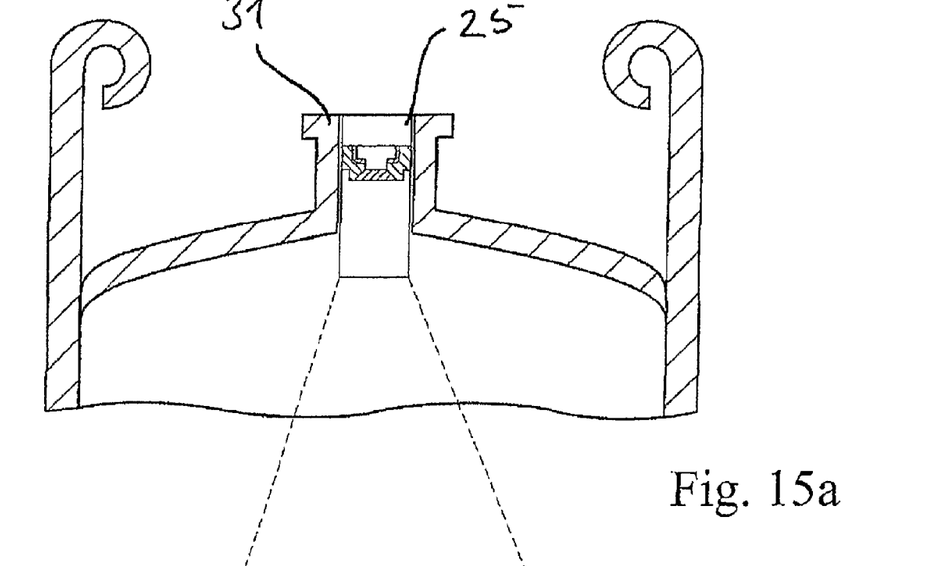
FIG. 15a a beverage barrel with a closure with an aerial structure.
Figure 15B:
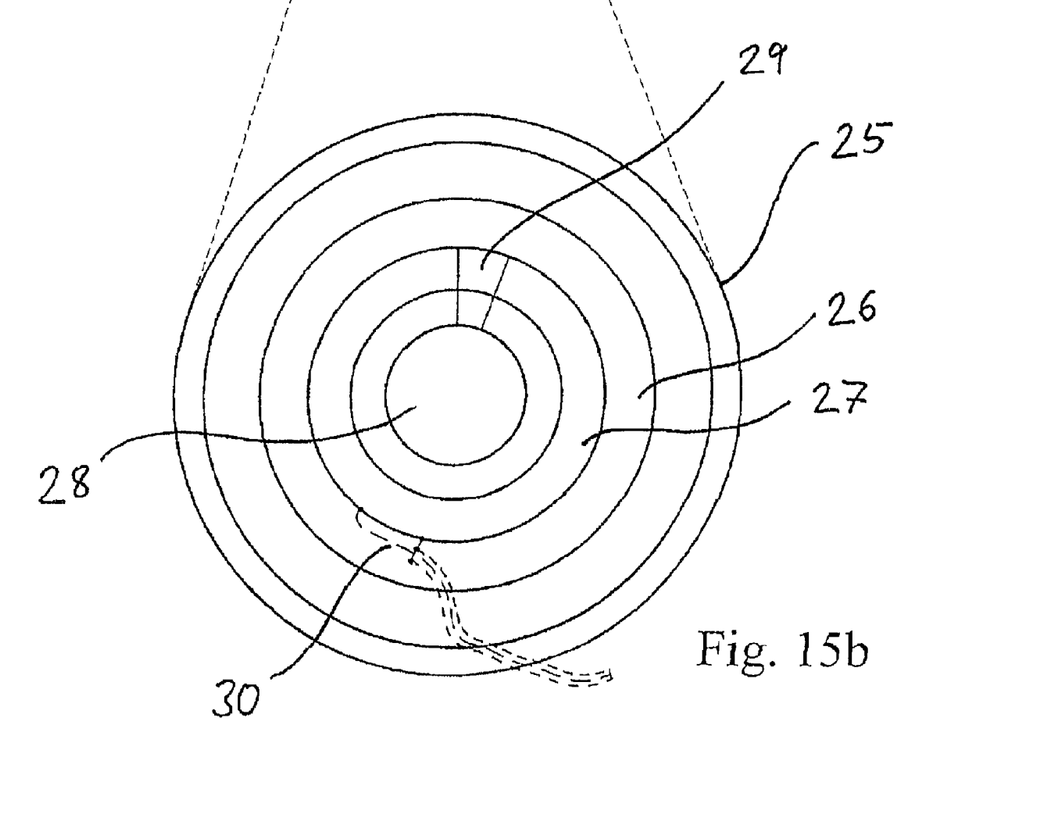

FIG. 15a shows a beverage barrel 20 with a closure 25 (also designated as a fitting) with an aerial structure for a transponder 2, whereas in FIG. 15 a detail view onto the aerial structure of the closure 25 from FIG. 15a is shown. The aerial structure as disclosed in FIGS. 15a and 15b is an alternative to the aerial as already described above which is formed in the metal component 1 by means of the recess 3.

The aerial structure is formed from a conductive material by means of a ring-shaped component 27. At one zone of the ring-shaped component 27, preferably at the rim zone, a contacting 30 is envisaged, by means of which, for example, a connection with a transponder is established by way of a coaxial cable 13.

Preferably, the ring-shaped component 27 has a break 29 which is formed from an electrically non-conductive material. In this case the contacting 30 should be preferably envisaged at a zone of the ring-shaped component 27 which lies opposite the break 29.

Preferably, the ring-shaped component 27 comprises a conductor loop which is arranged in an electrically non-conductive ring-shaped structural element.

In a preferred variant, a flat-shaped element 28 from an electrically non-conductive or a conductive material, for example from plastic or from metal, is envisaged which is surrounded by the ring-shaped structural component 27.

The aerial structure as presented here and which is installed in the closure cap can also be used for closures of other beverage containers. However, it can also be used as an independent aerial for transponder 2, independent of containers or their closures.

The features of the invention as disclosed in this description, in the claims and in the drawings can be of significance both individually as well as in random combination for the realisation of the invention in its various embodiments.

The invention claimed is:

1. Arrangement with a transponder (2) and a metal component (1) allocated to the transponder (2), characterised in that an aerial for the transponder (2) is formed by means of a recess (3) in the metal component (1), the arrangement further including a cover (17) allocated to the recess (3), the arrangement further including a cavity (23) which is enclosed by the cover (17) and the metal component (1), wherein the cavity is at least partially filled with a dielectric material.

2. Arrangement according to claim 1, characterised in that the cover (17) comprises one or a combination of the following materials: a metallic material and a non-metallic material.

3. Arrangement according to claim 1, characterised in that the dielectric material in the cavity (23) is formed from the same material as the cover (17).

4. Arrangement according to claim 1, characterised in that the cover and/or the dielectric material in the cavity (23) are/is formed as a screening.

5. Arrangement according to claim 1, characterised in that the aerial formed by means of the recess (3) in the metal component (1) is executed as a high frequency aerial and the transponder (2) is executed as a high frequency transponder.

6. Arrangement according to claim 1, characterised in that the recess (3) is formed at least partially as a breakthrough (5) in the metal component (1).

7. Arrangement according to claim 1, characterised in that the transponder (2) is secured to the metal component (1).

8. Arrangement according to claim 1, characterised in that the transponder (2) at least partially covers the recess (3).

9. Arrangement according to claim 1, characterised in that the recess (3) in the metal component (1) has an extended form.

10. Arrangement according to claim 1, characterised in that the recess (3) in the metal component (1) has the form of a ring segment.

11. Arrangement according to claim 1, characterised in that a connection (6) for transmitting signals is formed between the transponder (2) and the aerial formed by means of the recess (3) in the metal component (1).

12. Arrangement according to claim 11, characterised in that the connection (6) comprises a capacitive and/or an inductive coupling.

13. Arrangement according to claim 11, characterised in that the connection (6) is formed by means of contacts (7).

14. Arrangement according to any one of the claims 11, characterised in that the connection (6) comprises a coaxial cable (13).

15. Arrangement according to claim 1, characterised in that the transponder (2) is at least partially arranged in the recess (3) in the metal component (1).

16. Arrangement according to claim 15, characterised in that the transponder (2) is submerged fully in the recess (3) in the metal component (1).

17. Arrangement according to claim 1, characterised in that the recess (3) in the metal component (1) is partially or fully filled with a non-conductive material.

18. Arrangement according to claim 17, characterised in that the recess (3) in the metal component (1) is filled up with the non-conductive material, at least up to a thickness which is one fiftieth as large as the wavelength of the electromagnetic signals for which the aerial, formed by the recess (3) in the metal component (1), is designed.

19. Arrangement according to claim 1, characterised in that the metal component (1) with the recess (3) is part of a pipe-shaped component (15).

20. Arrangement according to claim 19, characterised in that the recess (3) is formed along the longitudinal axis of the pipe-shaped component (15).

21. Arrangement according to claim 1, characterised in that the metal component (1) with the recess (3) is part of a container.

22. Arrangement according to claim 21, characterised in that the container comprises a grid box (19).

23. Arrangement according to claim 21, characterised in that the container is a beverage barrel (20).

24. Arrangement according to claim 1, characterised in that the metal component (1) with the recess (3) is part of a motor vehicle registration plate (18).

25. Arrangement according to claim 1, characterised in that the transponder (2) comprises a further aerial.

* * * * *